Dec. 18, 1945.  J. E. TRAINER  2,391,108
FLUID COOLED WALL
Filed Aug. 6, 1941
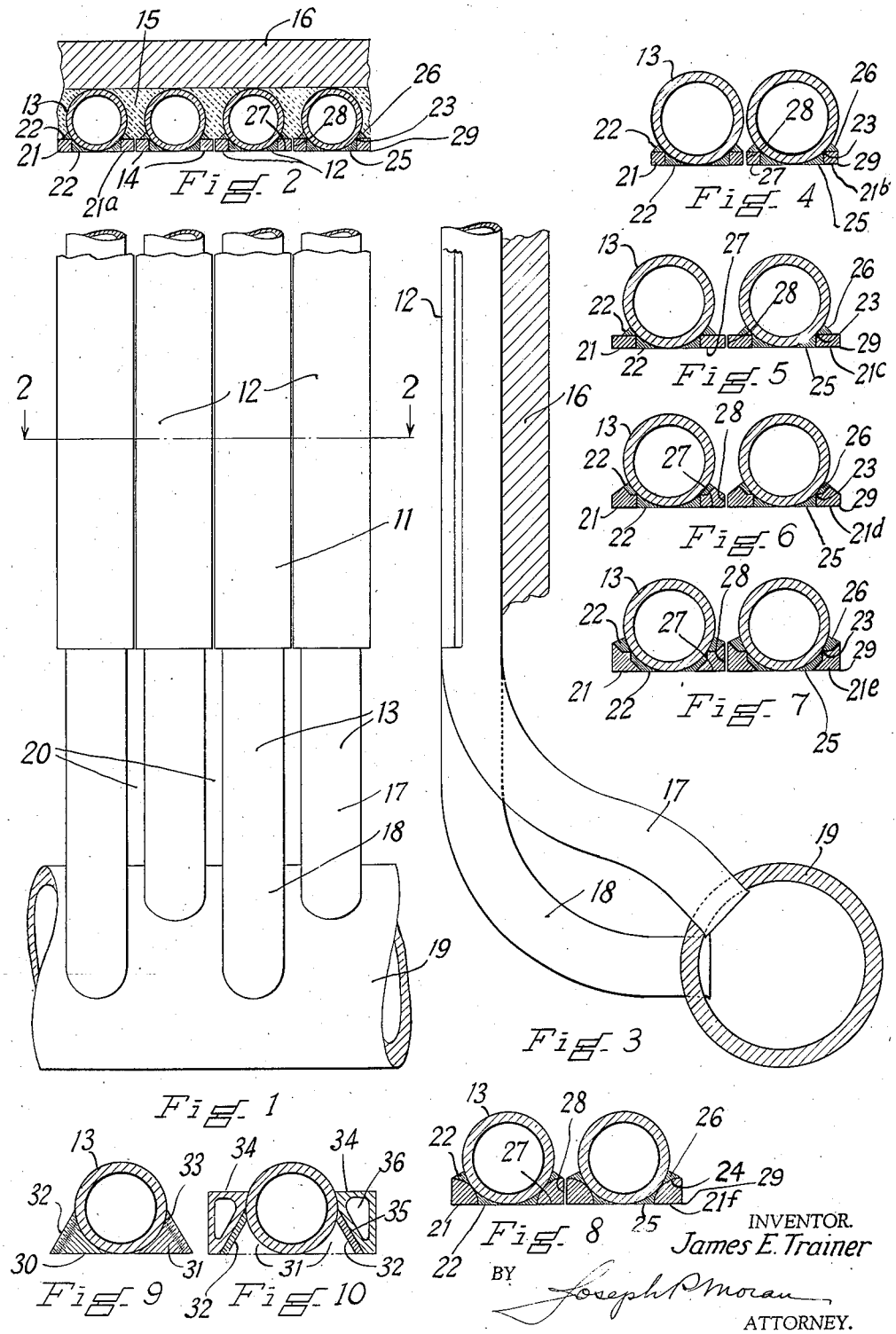
INVENTOR.
James E. Trainer
BY
ATTORNEY.

Patented Dec. 18, 1945

2,391,108

UNITED STATES PATENT OFFICE 2,391,108

FLUID COOLED WALL

James E. Trainer, Fairlawn, Ohio, assignor to The Babcock & Wilcox Company, Newark, N. J., a corporation of New Jersey Application August 6, 1941, Serial No. 405,620

15 Claims. (Cl. 122—6)

The invention herein disclosed relates to a fluid cooled wall and its components, such a structure being adapted for use in association with a combustion chamber for example, as a boundary wall, a partition, or a baffle, or in general for such conditions of service wherein the wall is exposed to heat of combustion on one or both of its sides. Such walls are conveniently formed a metallic tubular elements arranged at suitable spacings with provision for the circulation of a cooling fluid therethrough, the transfer of heat from the metal of the element to the contained fluid serving to prolong the life of the structure by maintaining the temperature of the metal at a safe working value. The heat thus transferred may serve an additional useful purpose in the generation of vapor, or in the superheating of vapor, depending on the phase of the fluid being circulated.

An object of the invention is to provide a fluid cooled wall of rugged construction and dependability wherein heat is transferred from the exposed face of the wall to the fluid at a maximum rate.

An additional object is to provide a wall structure adapted for furnace use wherein heat is conducted from the exposed wall surface through metal welded to metallic fluid conducting elements.

Another object is to provide a wall structure adapted for furnace use utilizing spaced fluid-conducting components extended externally wholly or in part by welding to present a substantially continuous metallic wall surface to the source of heat.

A further object is to combine spaced metallic conduits with preformed metallic surface extensions to form a fluid cooled furnace wall of substantially continuous surface area adapted for exposure on at least one side to heat of combustion.

Additional objects of the invention are directed to the welding of surface area extensions to individual elements, the shape of the extensions, and the manner of arrangement and attachment, whereby high rates of heat absorption may be maintained without risk of overheating the metal of either the element or its extension.

The foregoing and other related objects and advantages are more fully disclosed in the description which follows, as based on certain selected embodiments of the invention, as illustrated in the accompanying drawing, wherein:

Figs. 1 and 3 are fragmentary front and side elevations respectively of a wall embodying features of the invention;

Fig. 2 is a section along line 2—2 of Fig. 1;

Figs. 4 to 8 inclusive are sections similar to Fig. 2 indicating modifications;

Fig. 9 is a section showing a further modification; and

Fig. 10 is a section illustrative of a step in the formation of the structure of Fig. 9.

In detail, Figs. 1, 2 and 3 illustrate a wall comprising a series of metallic tubular elements 11 defining a substantially continuous, planar, exposed wall surface 12. Individual elements 11 may be formed from tubes 13 conveniently of circular cross section which are arranged in a row at relatively close spacings and extended laterally as at 14 to substantially close the spaces between adjacent tubes and to provide a relatively smooth and substantially continuous wall area on the side of the tubes toward the source of heat. As shown, the laterally extended elements 11 provide an exposed wall surface 12 in an upright plane, and parallel to the plane containing the longitudinal axes of the tubular components 13. A similar continuity of wall surface may be obtained if the tube axes should be curved instead of straight as shown, provided the transverse alignment of tubes at successive locations is maintained as in Fig. 2. For an outer furnace wall, for example, exposed to heat on one side only, the spaces between tubes in back of the lateral extensions 14 may be filled with a suitable plastic refractory 15 and the entire assembly backed with a heat insulating layer 16.

The tubes 13 may have their ends 17 and 18 bent and displaced as shown for connection with a header 19 in a plurality of rows to provide increased ligament strength, the connection thus established providing a convenient means for incorporating the elements in known manner into a fluid circulatory system whereby a liquid or other fluid to be heated may be caused to flow therethrough. Since it is customary to locate a header such as 19 exteriorly of the furnace setting, the bent tube ends 17 and 18 may also lie outside; however, a portion of the plain tube lengths 13 may be disposed interiorly of the setting, in which case the intertube spaces 20 adjacent one end of the wall area 12 may serve as gas flow passages.

Referring to Figs. 2, and 4 to 8 inclusive, the lateral extensions 14 are compositely formed to include a plurality of metallic bars or strips 21 extending longitudinally of the tubes, and weld metal 22 bonding such bars to the tube walls.

Each of these figures represents a different form of bar which is given a specific identifying symbol such as 21a, 21b, 21c, etc. In each case the bar is polygonal in cross-section, and is so assembled relative to a tube 13 as to present a minimum area of surface toward the tube wall or substantially in contact therewith; each bar 21a to 21e presenting a relatively sharp edge portion 23 affording substantially line contact with a tube 13, and bar 21f having a convex surface 24 similarly affording line contact with a tube 13 along an element of tangency. The surfaces of bars 21a to 21f adjoining the contacting edge or element form recesses 25, 26 for weld metal preferably deposited by a fusion welding process to provide a dense metallic mass of maximum heat conductivity having molecular engagement with both the bar and tube. Each bar is formed with a surface portion 27 in the plane of wall surface 12 and constituting a part thereof, and a transverse surface portion 28 forming a boundary of the extension 14 toward the adjacent wall element 11. In each of these forms, the welded connection with the fluid conductor is substantially continuous over an arc greater than 90°, the minimum condition being indicated in Fig. 4 where the width of the extension surface 14 is equal to the diameter of tube 13; the bars 21b being square in cross section, the extension surface being tangent to the tube wall, and the increase over 90° resulting from the metal deposited within the rearward recesses 26.

In view of the transverse relation of surfaces 27, 28, intersecting in an outer edge portion 29, as shown, the metal of the bar may be formed of an alloy especially adapted to withstand the high temperatures to which the edges 29 may be subjected, while of suitable heat conducting ability to maintain such edges at temperatures below the safe working limit of the metal utilized. The continuous transfer of heat from the outer edges 29 and from the adjoining surface portions 27, 28 results in a cooler exposed area less susceptible to oxidation and to slag adherence and a lower average overall temperature of the bar for longer operating service without deterioration. With tubes of low carbon steel, for example, a steel having a carbon content of 0.15% and preferably not exceeding 0.35%, the bars 21 may be of alloy steel of a general analysis about as follows:

|  | Per cent |
| --- | --- |
| Carbon | 0.15 |
| Manganese | 0.50 |
| Sulphur | 0.03 |
| Phosphorus | 0.03 |
| Silicon | 1.00 |
| Chromium | 6.50–7.50 |
| Molybdenum | 0.45–0.65 |

The weld metal being suitably of low carbon steel similar to that of the tube metal, or may be of an alloy steel corresponding to that of the bar metal. These analyses are not intended to be limiting however, since other combinations may be found useful for the purposes described, the main considerations being the maintenance of safe working temperatures throughout the entire extension structure and to provide a continuous transfer of heat at the maximum rate from the extension to the fluid within the tube.

A modified form of extension 30 is illustrated in Fig. 9, wherein the extension is formed preponderantly of weld metal deposited within the recesses 31 between the wall of a tube 13 and the bars or backing strips 32, the latter being oppositely arranged in angular relation to the final wall surface 12 with their relatively thin edge portions 33 closely adjacent the tube wall. The extension 30 may be formed by utilizing one or more chill bars 34 for supporting each bar 32 in proper relation to the tube 13 during the deposition of weld metal within the corresponding recess 31. The chill bars 34 are preferably made hollow as indicated at 36, in order that a suitable cooling fluid may be circulated therethrough, the inclined surface 35 of the chill bar conforming to that of the bar 32 which it supports for adequate dissipation of heat from the bar 32 during the welding operation. As will be understood, suitable inlets and outlets for the cooling fluid may be provided, and that for convenience of welding the parts shown in Fig. 10 would be in the reversed position, that is, with the recesses 31 opening upwardly, in which position the backing bars or strips 32 would lie against the supporting surfaces 35 by gravity. The weld metal may be of the desired analysis to provide an extension of suitable resistance to high furnace temperatures and of high heat conductivity.

In these various forms of extensions it will be noted that a minimum quantity of weld metal is required for the amount of exposed wall surface provided, and that wherever welding is required, the recess provided is of such form as to permit progressive deposition of weld metal from the apex outward for optimum heat transfer conditions, first by insuring intimate molecular engagement of weld metal with the tube and bars, and second by insuring maximum density of the deposit for maximum heat conductivity. After welding is completed, the exposed wall surface 12 may be utilized without further treatment to provide a slightly irregular or roughened surface where such a condition of surface may have utility; otherwise, the surface 12 may be ground or suitably machined to provide a smooth planar surface throughout the entire wall area, substantially tangent to the wall of each tube 13 and where preformed bars 21 are used, in alignment with the exposed bar surfaces 27.

While the disclosure of the invention has been made with reference to selected embodiments, in accordance with statutory requirements, it will be recognized that other embodiments are permissible, that certain features may be found useful independently of others, and that such features may be utilized to advantage in different combinations, wholly within the scope of the invention as defined by the appended claims.

I claim:

1. A composite heat transfer wall structure comprising, a tubular element having a convex area along at least one side thereof, and means forming an extension on said element to provide an exposed surface substantially tangent to said convex area, said extension being solid in cross section transversely of said element and having its total area of engagement with said element substantially continuous throughout an arc of approximately 90° minimum, said means including bars of polygonal cross section paralleling said element at circumferentially spaced locations, each bar having intersecting surfaces defining an inner edge in proximity to said element and an additional surface in the plane of said exposed surface, said inner edges being positioned adjacent the ends of said arc between said plane and the chord of said arc, said intersecting surfaces forming welding recesses adjacent the wall of said element at opposite sides of each edge, and weld metal deposited within said recesses integrally connecting said bars with said element.

2. A compositely formed furnace wall unit comprising, a tubular element adapted to carry a cooling fluid, and means forming a solid heat conducting extension integral with said element providing an exposed surface displaced from the longitudinal axis of said element at least to a position of substantial tangency with said element, said extension having its total area of engagement with said element substantially continuous throughout a given arc, said means including metallic members paralleling said element at circumferentially spaced locations adjacent opposite ends of said arc, each member presenting a convex surface portion toward the wall of said element to provide a minimum area of surface in proximity thereto and to form therewith welding recesses opening toward and away from the location of said exposed surface, and weld metal deposited within said recesses and substantially throughout said arc to complete said extension.

3. The method of modifying the external contour of a metal tube of curvilinear cross section to provide an extended area of heat transfer surface of substantially planar formation which comprises, arranging metallic bars or strips lengthwise of said tube at circumferentially spaced locations to define the outermost limits of said surface transversely of said tube, welding said strips to said tube by weld metal deposited by fusion therebetween throughout a substantially continuous arc of engagement with said tube of at least 90° and to the level of said planar surface, supporting said strips to maintain their spaced relation during the welding of said strips to the tube, and simultaneously subjecting said strips to the cooling effect of a confined circulating fluid.

4. A composite heat transfer wall unit comprising a tubular element adapted to carry fluid, and means forming a heat conducting extension on said element having a total area of engagement therewith substantially continuous throughout a predetermined arc, said extension presenting an exposed heat transfer surface substantially in a plane tangent to said element, said means including metallic members paralleling said element at circumferentially spaced locations and each having an outer surface portion forming a part of said heat transfer surface, each member presenting an edge portion toward said tubular element adjacent an end of said arc and having an adjoining inner surface portion defining with the wall of said element a welding recess opening inwardly of said arc toward the plane of said exposed surface, and means for securing said members to said element comprising weld metal substantially continuous throughout said arc filling said recesses and forming the remaining portion of said exposed surface.

5. A fluid cooled wall component adapted for exposure to furnace heat on one side thereof comprising a fluid-carrying tubular element of curvilinear cross section, and means forming a heat conducting extension on said element presenting an exposed surface substantially in a plane tangent to said element, said extension being solid and having its total area of engagement with said element substantially continuous throughout an arc of predetermined extent, said means comprising metallic bars paralleling said element at opposite ends of said arc, each bar having diverging outer surfaces terminating in edges radially spaced from said element, one of said surfaces forming an outer end portion of said exposed surface, each bar having an inner surface portion between said edges in substantially line contact with said element and having adjoining surface portions cooperating with said curved wall portion to define oppositely arranged welding recesses opening toward and away from said plane, and means for securing said bars to said element comprising weld metal deposited within said recesses in molecular engagement with said element substantially throughout said arc, said weld metal within the inner two of said recesses extending to said plane to complete the formation of said exposed surface.

6. A composite heat transfer wall structure comprising a tubular element of convex contour along at least one side thereof, and means forming an extension on said element to provide an exposed surface substantially tangent to said convex contour, said extension being solid in cross section transversely of said element and having its total area of engagement with said element substantially continuous throughout an arc of predetermined extent, said means including bars of polygonal cross section paralleling said element at circumferentially spaced locations, each bar having an outer surface portion forming a part of said exposed surface and having an inner edge portion presenting a minimum area of surface to the wall of said element inwardly adjacent one end of said arc, each bar having inner areas adjoining said edge portion for defining oppositely disposed welding recesses adjacent the wall of said element, and weld metal deposited within said recesses integrally connecting said bars with said element and filling the space between said bars substantially to the level of said exposed surface.

7. A compositely formed furnace wall unit comprising a fluid-carrying tubular element, and a solid metallic extension integral with said element providing an exposed area of heat absorbing surface displaced from the longitudinal axis of said element at least to a position of substantial tangency therewith, the width of said exposed surface being equal at least to the diameter of said element and the total area of engagement of said extension with said element being substantially continuous throughout an arc of predetermined extent, said extension including preformed metallic components spaced circumferentially of said element and defining therewith oppositely arranged welding recesses adjacent each of the opposite ends of said arc, means for securing said components to said element comprising weld metal deposited within said recesses in molecular engagement with said element and said components, said weld metal engaging said element substantially throughout said arc and filling the space between said components to the position of said exposed surface, said components forming the portions of said extension farthest from said element and being formed of metal more highly resistant to furnace heat than the metal of said tubular element.

8. A compositely formed furnace wall unit comprising a fluid-carrying tubular element, and a solid metallic extension integral with said element providing an exposed area of heat absorbing surface displaced from the longitudinal axis of said element at least to a position of substantial tangency therewith, said extension having its total area of heat transfer engagement with said element substantially continuous throughout arc of approximately 90° minimum, said extension including relatively thin metallic strips arranged longitudinally of said element at opposite ends of said arc and extending in width from a position adjacent said element to a position substantially coincident with said exposed surface to define a welding space between said strips of a dimension at said position of tangency equal at least to the diameter of said tubular element, and weld metal deposited within said space in molecular engagement with said element and said strips, said weld metal engaging said element substantially throughout said arc and filling said welding space to complete said extension.

9. A heat transfer wall structure comprising a tubular element having its outer surface convex along at least one side thereof, and means forming an extension having substantially continuous arcuate engagement throughout with said element and providing a substantially planar area of heat transfer surface displaced from the longitudinal axis of said element at least to a position of substantial tangency with said convex surface, said means including a pair of bars paralleling said element at opposite ends of said arc of engagement, each bar having outwardly facing surface portions intersecting in an outermost edge of said extension and including a portion forming a part of said heat transfer surface, said outwardly facing surface portions diverging from said outermost edge toward said element and terminating in edges radially spaced from said element, each bar having an inwardly facing surface portion intermediate said last named edges presenting a minimum area of surface in proximity to said element at a location inwardly of the adjacent end of said arc, said bars having inwardly facing surface areas adjoining said intermediate minimum areas defining pairs of oppositely arranged welding recesses with the wall of said element adjacent the ends of said arc, and weld metal filling said recesses for integrally uniting said bars with said element, said weld metal having substantially continuous engagement with said element throughout said arc and filling the space between said bars to complete the formation of said exposed heat transfer surface.

10. The method of modifying the external contour of a metal tube of curvilinear cross section to provide an extended area of heat transfer surface of substantially planar formation which comprises, arranging metallic bars or strips lengthwise of said tube at circumferentially spaced locations to define the outermost limits of said surface transversely of said tube, welding said surface to said tube by weld metal deposited by fusion therebetween throughout a substantially continuous arc of engagement with said tube and to the level of said planar surface, supporting said strips to maintain their spaced relation during the welding of said strips to the tube, and simultaneously subjecting said strips to the cooling effect of a confined circulating fluid.

11. The method of modifying the external contour of a metal tube of curvilinear cross section to provide an extended area of heat transfer surface displaced from the axis of said tube at least to a position of substantial tangency therewith, arranging a pair of relatively thin metallic bars or strips edgewise and lengthwise with respect to said tube at circumferentially spaced locations to define the outermost limits of said surface transversely of said tube, said strips extending outwardly from adjacent said tube at least to a common plane tangent thereto, depositing weld metal onto said tube in a continuous body integral with said tube and completely filling the space between said strips at least to the level of said common plane, supporting said strips to maintain their spaced relation during the deposition of said weld metal, and simultaneously subjecting said strips to the cooling effect of a confined circulating fluid.

12. A compositely formed heat transfer wall unit comprising a tubular element of curvilinear cross section adapted to carry fluid, and means forming a solid heat conducting extension on said element having a total area of engagement therewith substantially continuous throughout a predetermined arc, said extension presenting an exposed area of heat transfer surface displaced from the longitudinal axis of said element at least to a position of substantial tangency therewith, said means comprising a pair of metallic bars of solid quadrilateral cross section paralleling said element at circumferentially spaced locations, each bar having one of its four sides substantially coincident with said exposed surface and having two of its other sides intersecting in an edge portion in proximity to said element adjacent an end of said arc, one of said last named sides of each bar defining with the wall of said element a welding recess opening inwardly of said arc toward the location of said exposed surface, and means for securing said bars to said element comprising weld metal deposited in a substantially continuous body throughout said arc, said weld metal filling said recesses and completing the formation of said exposed surface.

13. A composite furnace wall unit comprising a fluid conducting tubular element of curvilinear cross section, and means forming a heat conducting extension on said element providing exterior heat absorbing surface substantially in a plane tangent thereto, said extension being of solid formation and having a total area of welded engagement with said element substantially continuous throughout a given arc, said means comprising a metallic bar paralleling said element and having diverging outer surfaces terminating in edges radially spaced from said element, one of said surfaces forming the portion of said exterior surface farthest from said element, said bar having an inner surface portion between said edges in contiguous relation to said element along a line intermediate the ends of said arc and having adjoining surface portions cooperating with said curved wall portion at opposite sides of said line to define welding recesses opening toward and away from said plane, and means for securing said bar to said element comprising weld metal deposited within said recesses in molecular engagement with said element substantially throughout said arc, said weld metal within one of said recesses extending to said plane to complete the formation of said exterior surface.

14. A composite heat transfer unit comprising a tubular element adapted to carry fluid, and means for extending the exterior heat transfer surface of said element comprising a heat conducting extension member on said element having a total area of welded engagement therewith substantially continuous throughout a predetermined arc, said member providing exterior heat transfer surface substantially in a plane tangent to said element, said member including a metallic bar paralleling said element and providing an outer surface portion forming a part of said exterior heat transfer surface, said bar presenting an inner edge portion toward said tubular element intermediate the ends of said arc and having adjoining inner surface portions defining with the wall of said element welding recesses opening toward and away from the plane of said exterior surface, and means for securing said bar to said element comprising weld metal filling said recesses and engaging said element substantially throughout said arc.

15. A composite heat transfer unit comprising a fluid conducting tubular element of curvilinear cross section, and means for extending the exterior heat transfer surface of said element comprising a pair of oppositely arranged heat conducting extension members each providing exterior heat transfer surface substantially in a plane tangent to said element and having a total area of welded engagement therewith substantially continuous throughout a predetermined arc, each of said extension members including a metallic bar paralleling said element and having a substantially planar outer surface portion forming a part of the heat transfer surface provided by the associated member, said bar for each member presenting an inner surface portion toward said element in contiguous relation thereto along a line intermediate the ends of said arc, each of said bars having other inner surface portions cooperating with the wall of said element at opposite sides of said line to define welding recesses opening toward and away from the plane of said outer surface portion, and means for securing said bars to said element comprising weld metal filling said recesses and engaging said element substantially throughout each of said arcs.

JAMES E. TRAINER.